United States Patent Office 3,468,158
Patented Sept. 23, 1969

3,468,158
METHOD OF AND APPARATUS FOR DETERMINING RHEOLOGICAL PROPERTIES OF NON-NEWTONIAN FLUIDS SUCH AS DRILLING FLUIDS OR THE LIKE
Sze-Foo Chien, Houston, Tex., assignor to Texaco Inc., New York, N.Y., a corporation of Delaware
Continuation-in-part of application Ser. No. 481,195, Aug. 20, 1965. This application Mar. 26, 1968, Ser. No. 716,202
Int. Cl. G01n 11/04
U.S. Cl. 73—55                                     19 Claims

ABSTRACT OF THE DISCLOSURE

A method and apparatus for determining the yield stress and plastic viscosity of a non-Newtonian fluid which consists of pumping the fluid through a tube of known diameter at a known flow rate and measuring the pressure drop for a given length. The procedure is then repeated for a different set of conditions and the yield stress and plastic viscosity are calculated from formulas for laminar flow. Similar measurements are used to obtain the two constants characterizing the rheological properties of power law fluids.

CROSS REFERENCE

This is a continuation-in-part application of my application for patent, Ser. No. 481,195, filed on Aug. 20, 1965 now abandoned.

FIELD OF THE INVENTION

The present invention relates to a method and apparatus for determining both the yield stress and the plastic viscosity of Bingham type fluids, such as drilling muds, slurries, greases, and other plastic fluids, such as tomato sauce, mayonnaise, catsup, toothpaste, ice cream, and batters for cookies and cakes, as well as for determining the two constants characterizing the rheological properties of power law fluids such as suspensions of paper pulp or pigments and starch or mica suspensions in water.

There are now available laboratory instruments for measuring the yield stress and the plastic viscosity of plastic fluids, but these instruments are neither accurate nor foolproof when the plastic fluid contains minute particles of material other than the initial suspended minute particles. For example, in drilling muds, lost circulation material and chips from rock formations interfere with measurements. Likewise, fragments of nuts or fruits in ice cream and in batters pose problems. Moreover, the known instruments do not permit these properties to be measured continuously during an operation such as the drilling of an oil well.

SUMMARY OF THE INVENTION

In accordance with the present invention, there are provided novel methods for determining both the yield stress and plastic viscosity of Bingham type fluids, which involves pumping the plastic fluid to be tested through a tube of known diameter at a known flow rate, measuring the pressure drop, $dP_1$, along a known length of the tube, $L_1$, and determining the pressure drop per unit of length, $dP_1/L_1$, repeating the pressure drop measurement at a different set of conditions involving either the tube diameter and/or flow rate, and the same or different length $L_2$ over which the pressure drop, $dP_2$, is measured, and determining the pressure drop per unit of length, $dP_2/L_2$, and determining from the known dimensions and quantities and the measured pressure drops, the yield stress and plastic viscosity of Bingham type fluids and the two constants for power law fluids by means of the relationships expressed by the formulas as derived below. These formulas are correct only for laminar flow of the Bingham type fluids and consequently the present method and apparatus are limited to laminar flow conditions therefor. This is not a serious limitation in actual practice.

BRIEF DESCRIPTION OF THE DRAWING

The principles of the method and the apparatus of this invention will be described more in detail hereinafter with reference to the accompanying drawings, wherein.

DESCRIPTION OF THE PREFERRED EMBODIMENTS

The formulas which relate the known and the measured quantities with the yield stress and plastic viscosity of Bingham type fluids are derived as follows.

Theory

In general, a non-Newtonian fluid has the characteristic that, in laminar flow, the rate of shear $(dv/dr)$ is a function $\phi$ of the shear stress $\tau$, i.e.

(1) $$(dv/dr) = \phi(\tau)$$

where:
$v$ = velocity
$r$ = radical distance

In the case of the Bingham type fluids, the function $\phi$ becomes (2) $$\phi(\tau) = \frac{g_c}{\eta}(\tau - \tau_y) \text{ for } \tau \text{ greater then } \tau_y$$
$$= 0 \quad \text{for } \tau \text{ less than } \tau_y$$

where:

$g_c$ is the gravitational conversion factor,
$\eta$ is the coefficient of rigidity,
$\tau_y$ is the yield stress of the fluid.

Considering flow in a circular pipe, a balance of forces gives (3) $$2r/D = \tau/\tau_w$$

where:
$r$ is the radial distance,
$D$ is the diameter of the pipe,
$\tau_w$ is the shear stress at the pipe wall.

Combining Equations 1, 2 and 3, the velocity, and hence the volume flow rate, $Q$, can be obtained by integration.

(4) $$Q = \frac{\pi}{32} \frac{D^3 g_c \tau_w}{\eta} \left[ 1 - \frac{4}{3} \frac{\tau_y}{\tau_w} + \frac{1}{3} \frac{\tau_y^4}{\tau_w^4} \right]$$

Using the definition of wall shear, and for flows where the yield stress is small compared with wall shear, Equation 4 is approximated by:

(5) $$Q = \frac{\pi}{32} \frac{D^3 g_c}{\eta} \left[ \frac{D}{4} \frac{dP}{L} - \frac{4}{3} \tau_y \right]$$

where $dP$ is the pressure drop along a length L of the pipe. Equation 5 contains the two unknowns, $\eta$ and $\tau_y$. Consequently, in order to determine the value of these unknowns, it is necessary to have two independent equations. This can be done by making observations at two different sets of working conditions, substituting values in Equation 5, and then solving for the two unknowns. We thus obtain:

(6a) $$Q_1 = \frac{\pi}{32} \frac{D_1^3 g_c}{\eta} \left[ \frac{D_1}{4} \frac{dP_1}{L_1} - \frac{4}{3} \tau_y \right]$$

(6b) $$Q_2 = \frac{\pi}{32} \frac{D_2^3 g_c}{\eta} \left[ \frac{D_2}{4} \frac{dP_2}{L_2} - \frac{4}{3} \tau_y \right]$$

Solving these equations for $\eta$ and $\tau_y$, we get General Equations (7) $$\eta = \frac{\pi g_c}{32} \frac{(D_1 D_2)^3}{Q_2 D_1^3 - Q_1 D_2^3} \left[ \frac{D_2}{4} \frac{dP_2}{L_2} - \frac{D_1}{4} \frac{dP_1}{L_1} \right]$$

(8) $$\tau_y = \frac{3}{16} \frac{Q_2 D_1^4 (dP_1/L_1) - Q_1 D_2^4 (dP_2/L_2)}{Q_2 D_1^3 - Q_1 D_2^3}$$

Figure 1:
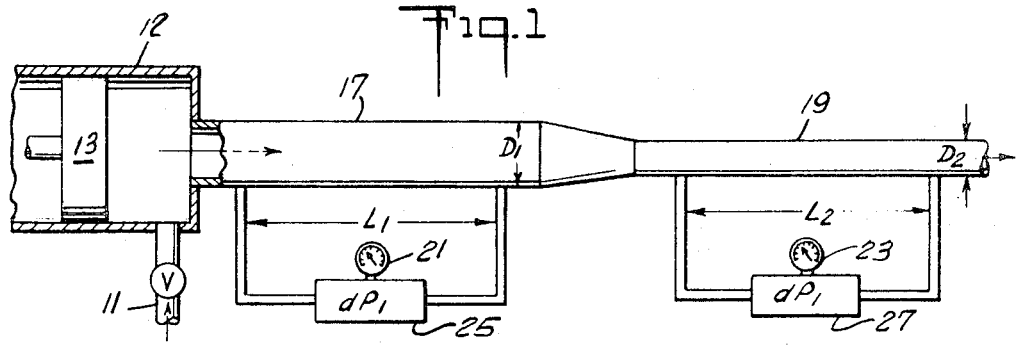
FIG. 1 is a schematic view showing an embodiment of my apparatus, wherein two tubes of different diameters are connected in series with one another, and a single pump is employed.
Figure 1A:
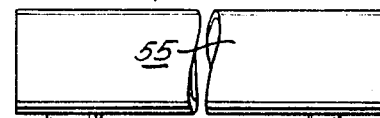
FIG. 1a is a partial schematic view of another embodiment of the apparatus of FIG. 1, showing the two tubes of different diameters leaving in parallel from a common source, involving two pumps of equal capacity.

One preferred method of making observations involves letting the same flow, $Q_1 = Q_2 = Q$, occur in both pipes; e.g. the pipes might be connected in series, as in FIG. 1, or in parallel, as in FIG. 1a, and the same flow, Q, occurs in both pipes. In this method, Equations 7 and 8 reduce to Constant Flow Equations:

(7a) $$\eta = \frac{\pi g_c}{32 Q} \frac{(D_1 D_2)^3}{D_1^3 - D_2^3} \left[ \frac{D_2}{4} \frac{dP_2}{L_2} - \frac{D_1}{4} \frac{dP_1}{L_1} \right]$$

(8a) $$\tau_y = \frac{3}{16} \frac{1}{D_1^3 - D_2^3} \left[ D_1^4 \frac{dP_1}{L_1} - D_2^4 \frac{dP_2}{L_2} \right]$$

Equations 7a and 8a are simplified greatly when the values for $D_1$, $D_2$, Q, $L_1$ and $L_2$ are constants, which make it possible to calculate values by substitution in the equations as follows:

(7aa) $$\eta = K_2(dP_2) - K_1(dP_1)$$

(8aa) $$\tau_y = K_4(dP_2) - K_3(dP_1)$$

wherein:

$$K_1 = \frac{\frac{D_1}{4} \frac{1}{L_1}}{\frac{32Q}{\pi g_c} \left( \frac{1}{D_2^3} - \frac{1}{D_1^3} \right)}$$

$$K_2 = \frac{\frac{D_2}{4} \left( \frac{1}{L_2} \right)}{\frac{32Q}{\pi g_c} \left( \frac{1}{D_2^3} - \frac{1}{D_1^3} \right)}$$

$$K_3 = \frac{3}{16} \left( \frac{1}{D_2^3 - D_1^3} \right) D_1^4 \left( \frac{1}{L_1} \right)$$

$$K_4 = \frac{3}{16} \left( \frac{1}{D_2^3 - D_1^3} \right) D_2^4 \left( \frac{1}{L_2} \right)$$

Another preferred method of making observations involves keeping the pipe sizes the same in both sets of observations. This can be accomplished by pumping at different flow rates, $Q_1$ and $Q_2$, through two pipes of equal diameter, D, as in FIG. 1b and observing the corresponding $dP_1/L_1$ and $dP_2/L_2$, which are obtained. Alternatively, one can use one pipe and make these two observations, at different flow rates in sequence, as in FIG. 1c, where the fluid is homogeneous and its characteristics do not vary with time. In this method, Equations 7 and 8 reduce to Constant Diameter Equations (7b) $$\eta = \frac{\pi g_c D^4}{128} \frac{1}{Q_2 - Q_1} \left( \frac{dP_2}{L_2} - \frac{dP_1}{L_1} \right)$$

(8b) $$\tau_y = \frac{3D}{16} \frac{Q_2(dP_1/L_1) - Q_1(dP_2/L_2)}{Q_2 - Q_1}$$

If proper electric analog circuitries are devised for Equations 7 and 8, $\eta$ and $\tau_y$ could be registered with electric signals of $dP_1$ and $dP_2$.

In contrast to a Bingham type fluid, characterized by yield stress and plastic viscosity, and whose relationship between the shear stress and rate of shear deformation is a straight-line on a linear plotting, a power law fluid shows a straight line relationship between the shear stress and the rate of shear deformation on log-log plotting.

A power low fluid is a class of fluid whose flow behavior can be described (by formula) as (9) $$\tau = K \left( -\frac{dv}{dr} \right)^n$$

where:

$\tau$ = shear stress
$dv/dr$ = rate of shear with:

$v$ = velocity and
$r$ = radial distance and K and $n$ are two constants characterizing the rheological properties of the fluid.

For fluid flow in a pipe, a balance of force results, so that

(10) $$\tau = \frac{r}{2} \frac{\Delta p}{\Delta L}$$

where $\Delta p / \Delta L$ is the pressure drop in distance $\Delta L$ and $r$ is a radial distance.

Equating the last two equations, the rate of shear deformation becomes:

(11) $$\frac{dv}{dr} = -\left( \frac{r}{2K} \frac{\Delta p}{\Delta L} \right)^{\frac{1}{n}}$$

Integration of Equation 11, with the condition that $r = D/2$, $v = 0$ (i.e. the velocity at the wall of the pipe is zero), the velocity distribution can be obtained.

(12) $$v = \left( \frac{1}{2K} \frac{\Delta p}{\Delta L} \right)^{\frac{1}{n}} \left( \frac{n}{n+1} \right) \left[ \left( \frac{D}{2} \right)^{\frac{n+1}{n}} - r^{\frac{n+1}{n}} \right]$$

where D is the diameter of the pipe.

By integration of the velocity distribution across the pipe cross-sectional area, the volume flow rate Q is obtained, viz.,

(13) $$Q = \pi \left( \frac{1}{2K} \frac{\Delta p}{\Delta L} \right)^{\frac{1}{n}} \left( \frac{n}{3n+1} \right) \left( \frac{D}{2} \right)^{\frac{3n+1}{n}}$$

This last equation is basic for the use of the disclosed apparatus under either constant or variable flow conditions for a power law fluid. Fluid is pumped at a constant volume flow rate through two pipes of different diameters, the pipes being either in series or in parallel as in FIGS. 1 and 1a.

From Equation 13, the flow in the pipe with diameter $D_1$ may be written as (13a) $$Q_1 = \pi \left(\frac{D_1}{2}\right)^{\frac{3n+1}{n}} \left(\frac{n}{3n+1}\right) \left(\frac{1}{2K}\frac{\Delta P_1}{\Delta L_1}\right)^{\frac{1}{n}}$$

and the flow through the pipe with diameter $D_2$ (13b) $$Q_2 = \pi \left(\frac{D_2}{2}\right)^{\frac{3n+1}{n}} \left(\frac{n}{3n+1}\right) \left(\frac{1}{2K}\frac{\Delta P_2}{\Delta L_2}\right)^{\frac{1}{n}}$$

Since $Q_1 = Q_2$, the two equations can be combined to give the Constant Flow Equation.

(14) $$\frac{\Delta P_2}{\Delta P_1} = \left(\frac{D_1}{D_2}\right)^{3n+1} \left(\frac{\Delta L_2}{\Delta L_1}\right)$$

The disclosed apparatus can be designed such that $$\frac{D_1}{D_2} = \frac{\Delta L_1}{\Delta L_2}$$

and thus the Equation 14 could be further simplified

(15) $$\frac{\Delta p_2}{\Delta p_1} = \left(\frac{D_1}{D_2}\right)^{3n}$$

or (15a) $$\frac{\Delta p_2}{\Delta p_1} = A^n$$

where A is a constant and is equal to $$\left(\frac{D_1}{D_2}\right)^3$$

Equation 15a shows that the ratio $\Delta p_2/\Delta p_1$ can be used to indicate the characteristic parameter $n$ of a power law fluid.

Once the $n$ has been determined, the value of the other characteristic parameter K can be readily determined from either one of the Equations 13a or 13b.

Take, for example, Equation 13b, and rearranging

(16) $$K = \left(\frac{\pi}{Q}\right)^n \left(\frac{n}{3n+1}\right)^n \left(\frac{D_2}{2}\right)^{3n+1} \left(\frac{1}{2\Delta L_2}\right) \Delta p_2$$

or (16a) $K = B \Delta p_2$ where $$B = \left(\frac{\pi}{Q}\right)^n \left(\frac{n}{3n+1}\right)^n \left(\frac{D_2}{2}\right)^{3n+1} \left(\frac{1}{2\Delta L_2}\right)$$

Equation 16 shows that once $n$ has been determined, the value of B and hence the value of K also can be determined.

Thus, the two rheological characteristics $n$ and K of the power law fluid can be determined readily from the two pressure drop readings.

Fluid may be pumped through pipes of diameter D at different flow rates. It can be achieved by either using two pumps at different flow rates, as in FIG. 1b or one pump capable of delivering different flow rates as in FIG. 1c.

The operating principle involved is similar to that previously disclosed. The value of $n$ can be obtained for variable flow conditions from

(17) $$\frac{\Delta p_2}{\Delta p_1} = \left(\frac{Q_2}{Q_1}\right)^n \left(\frac{\Delta L_2}{\Delta L_1}\right)$$

where $Q_1$ and $Q_2$ are the two flow rates.

Once $n$ is determined, the value of K can be obtained from either one of the following equations:

(16a) $$K = \left(\frac{\pi}{Q_1}\right)^n \left(\frac{n}{3n+1}\right)^n \left(\frac{D}{2}\right)^{3n+1} \frac{1}{2\Delta L} \Delta p_1$$

or (16b) $$K = \left(\frac{\pi}{Q_2}\right)^n \left(\frac{n}{3n+1}\right)^n \left(\frac{D}{2}\right)^{3n+1} \frac{1}{2\Delta L} \Delta p_2$$

where $\Delta L$ is the distance between pressure taps and $\Delta p_1$ and $\Delta p_2$ are the pressure drops corresponding to flow rates $Q_1$ and $Q_2$.

Thus, the two rheological characteristic constants of power law fluids can be determined readily from the pressure drop data for variable flows.

Again, if proper electric analog circuitries are devised for Equations 14 and 17, $n$ and K could be registered with electric signals of $p_1$ and $p_2$. Alternatively, nomographs could be used, also to solve for the yield stress and plastics viscosity of Bingham type fluids.

Referring to FIG. 1, a plastic fluid such as a drilling mud enters through a line 11 into a pump 12 containing a piston 13 actuated in a manner to pump fluid through a first length of tube 17, of relatively large diameter $D_1$ and then in series through a second length of tube, 19, of relatively smaller diameter $D_2$. The pump 12 is so designed and operated as to cause the plastic fluid to flow at a constant volume flow rate and within the range of laminar flow.

It is evident that the sizes of tubes 17 and 19 can be reversed so that the fluid first passes through a tube of smaller diameter and then through one of larger diameter. Also, other types of constant flow pumps may be used, e.g. a screw type pump.

The pressure drops across the two lengths of the tubes, $L_1$ for tube 17, and $L_2$ for tube 19, are continuously measured by pressure differential transducers 25, 27 having gauges 21 and 23, and from the observed values, the plastic viscosity $\eta$ and the yield stress $\tau_y$ are calculated by substitution in Equations 7a and 8a above, wherein:

$D_1$ = diameter of large tube 17—feet
$L_1$ = selected length of large tube 17—feet
$D_2$ = diameter of small tube 19—feet
$L_2$ = selected length of small tube 19—feet
$dP_1$ = pressure drop across length $L_1$—lbs. force/ft.$^2$
$dP_2$ = pressure drop across length $L_2$—lbs. force/ft.$^2$
Q = volume flow rate—cubic feet/second
$g_c$ = gravitational conversion factor—

$$\frac{32.174 \text{ lb. mass ft.}}{\text{lb. force sec.}^2}$$

$\eta$ = plastic viscosity—lb. mass/ft. sec.
$\tau_y$ = yielding point—lb. force/ft.$^2$ In the embodiments disclosed in the remaining figures of the drawings, the plastic fluid, such as drilling mud, is provided from a common source, such as mud tank or conduit 55. In FIG. 1a, pipes of different diameters, $D_1$ and $D_2$, lead off from such a common source, with pumps providing a constant flow indicated at $P_1$ in each pipe. This embodiment is the parallel set up of the series set up in FIG. 1.

Figure 1B:
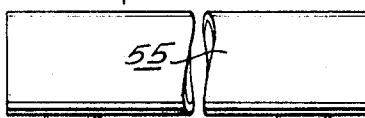
FIG. 1b is another partial schematic view of another embodiment showing two tubes of the same diameter leaving from a common source, involving pumps having different capacities.
Figure 1C:
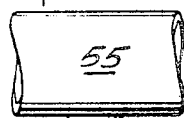
FIG. 1c shows a tube of constant diameter wherein flow is controlled by a variable pump.

In FIG. 1b, pipes of equal diameters, D, lead off from the common source, 55, the pipes having respective pumps with different flow rates indicated at $P_1$ and $P_2$; while in FIG. 1c, a single pipe of a constant diameter, D, leads off from the common source, 55, with a variable drive pump, indicated as PVD, interposed therebetween, to provide a variable flow rate. In these three figures, the tap-offs for measurement of the differential pressures are shown partially.

Figure 2:
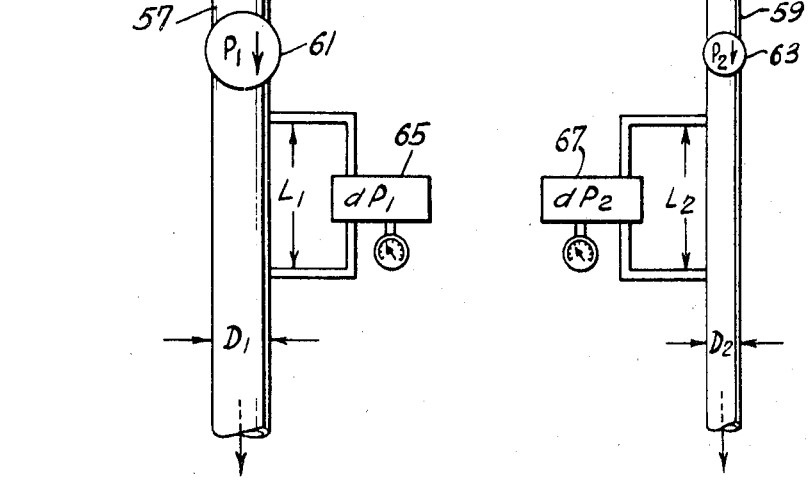
FIG. 2 is a schematic view of another modification of my apparatus, wherein two tubes of different diameters are connected in parallel into a common source, and wherein separate pumps are employed to pump fluid through each of the tubes.

In the embodiment shown in FIG. 2, two streams of plastic fluid are taken off from a conduit 55, via a first relatively large conduit 57, of diameter $D_1$, and a second relatively smaller conduit 59, of diameter $D_2$, arranged in parallel therewith.

Pumps 61 and 63 are operated to pump plastic fluid through the conduits 57 and 59 with laminar flow, and the pressure drops across lengths $L_1$ and $L_2$ of the tubes are measured by differential pressure measuring transducers 65 and 67.

I claim:
1. A method for determining the coefficient of rigidity of a non-Newtonian plastic fluid comprising:
   (a) passing said fluid in laminar flow through a tube of known diameter at a known volumetric flow rate,
   (b) measuring under these first conditions; the pressure drop across a known length of said tube and determining the pressure drop per unit of length, $dP_1/L_1$,
   (c) repeating measuring of the pressure drop under second conditions developing a different pressure drop per unit of length, $dP_2/L_2$,
   (d) and determining said coefficient of rigidity in accordance with the equation that

$$\eta = \frac{\pi g_c}{32} \frac{(D_1 D_2)^3}{Q_2 D_1^3 - Q_1 D_2^3} \left[ \frac{D_2 dP_2}{4L_2} - \frac{D_1 dP_1}{4L_1} \right]$$

when:

$\eta$ = coefficient of rigidity (or viscosity)
$g_c$ = gravitational conversion factor
$D_1$ = pipe diameter for the first test conditions
$D_2$ = pipe diameter for the second test conditions
$L_1$ = length of pipe for the first test conditions
$L_2$ = length of pipe for the second test conditions
$dP_1$ = pressure drop for the first test conditions
$dP_2$ = pressure drop for the second test conditions
$Q_1$ = volume flow rate for the first test conditions
$Q_2$ = volume flow rate for the second test conditions 2. The method in accordance with claim 1 wherein the measurements of the pressure drops are taken at the same volume flow rate.

3. The method in accordance with claim 1 wherein steps (b) and (c) are made in first and second tubes arranged in series, and a single pump passes said plastic fluid through both of said tubes.

4. A method in accordance with claim 1, wherein said plastic fluid is located in a common source, and
   wherein steps (b) and (c) are taken in first and second tubes separately connected to said common source in parallel with one another, and
   wherein said plastic fluid is pumped through said separate tubes by separate pumps therein.

5. The method in accordance with claim 4 wherein said plastic fluid is passed through both of said tubes at the same volume flow rate.

6. The method in accordance with claim 5 wherein tube diameters and known lengths across which pressure drop is measured are constant for both pressure drop measurements.

7. A method in accordance with claim 1 wherein said lengths $L_1$ and $L_2$, said diameters $D_1$ and $D_2$, and said volume flow rate are all maintained constant.

8. The method in accordance with claim 4 wherein said first and second tubes have different diameters, and wherein said plastic fluid is pumped at the same flow rate through both tubes.

9. The method in accordance with claim 4 wherein said first and second tubes have the same diameter, and wherein said plastic fluid is pumped at different flow rates in said tubes.

10. The method in accordance with claim 1 wherein said measurements are made in a single tube, said plastic fluid being passed through said tube in two runs at different flow rates.

11. Apparatus for determining both plastic viscosity and yielding stress of a plastic fluid comprising:
    a first tube of relatively large diameter;
    a second tube of relatively smaller diameter;
    means for pumping plastic fluid through both of said tubes at the same volume flow rate;
    means for measuring pressure drop across a length of said first tube; and
    means for measuring simultaneously the pressure drop across a length of said second tube.

12. Apparatus in accordance with claim 11 wherein said first and second tubes are connected in series with one another, and wherein said pumping means is a single pump for pumping said plastic fluid through said tubes successively.

13. Apparatus in accordance with claim 11 wherein said first and second tubes are arranged in parallel and separately connected to a common source of said plastic fluid; and
    wherein said pumping means comprises separate pumps for pumping said plastic fluid through said first and second tubes.

14. A method for determining the yield stress of a plastic fluid comprising:
    (a) passing said fluid in laminar flow through a tube of known diameter at a known volumetric flow rate,
    (b) measuring the pressure drop across a known length of said tube and determining the pressure drop per unit of length, $dP_1/L_1$.
    (c) repeating measuring of the pressure drop under second conditions developing a different pressure drop per unit of length $dP_2/L_2$, and
    (d) determining said yield stress in accordance with the equation that $$\tau_y = \frac{3}{16} \frac{(Q_2 D_1^4)(dP_1/L_1) - Q_1 D_2^4 (dP_2/L_2)}{Q_2 D_1^3 - Q_1 D_2^3}$$

wherein:

$\tau_y$ = the yield stress of the fluid
$D_1$ = pipe diameter for the first test conditions
$D_2$ = pipe diameter for the second test conditions
$L_1$ = length of pipe for the first test conditions
$L_2$ = length of pipe for the second test conditions
$dP_1$ = pressure drop for the first test conditions
$dP_2$ = pressure drop for the second test conditions
$Q_1$ = volume flow rate for the first test conditions
$Q_2$ = volume flow rate for the second test conditions 15. A method for determining the characteristic parameter $n$ of a power law non-Newtonian fluid comprising:
    (a) passing said fluid through a tube of known diameter at a known volumetric flow rate,
    (b) measuring the pressure drop ($\Delta P_1$) across a known length ($\Delta L_1$) of said tube in a first test section;
    (c) repeating measuring of the pressure drop across another known length ($\Delta L_2$) of said tube in a second test section; under conditions developing a different pressure drop ($\Delta P_2$),
    (d) and determining said parameter $n$ in accordance with the equation $$\frac{\Delta P_2}{\Delta P_1} = \left(\frac{D_1}{D_2}\right)^{3n+1} \left(\frac{\Delta L_2}{\Delta L_1}\right)$$

where:

$L_1$ = tube length at the first test section
$L_2$ = tube length at the second test section
$P_1$ = pressure drop at the first test section
$P_2$ = pressure drop at the second test section
$D_1$ = tube diameter at the first test section
$D_2$ = tube diameter at the second test section 16. The method in accordance with claim 15 wherein steps (b) and (c) are made in first and second tubes arranged in series, and a single pump passes said fluid through both of said tubes.

17. A method in accordance with claim 15 wherein said fluid is located in a common source, and
    wherein steps (b) and (c) are taken in first and second tubes separately connected to said common source in parallel with one another, and
    wherein said fluid is pumped through said separate tubes by separate pumps therein.

18. A method in accordance with claim 15 wherein the ratio of said lengths $L_1$ and $L_2$ to each other is equal to the ratio of said diameters $D_1$ and $D_2$ to each other.

19. A method for determining the characteric parameter K of a power law non-Newtonian fluid comprising:
  (a) passing said fluid through a test section of a tube of known diameter at a known volumetric flow rate,
  (b) measuring the pressure drop across a known length of said tube, and
  (c) determining said parameter K in accordance with the equation $$K = \left(\frac{\pi}{Q}\right)^n \left(\frac{n}{3n+1}\right)^n \left(\frac{D}{2}\right)^{3n+1} \left(\frac{1}{2\Delta L}\right) \Delta P$$

where:

D = tube diameter of test section
$\Delta L$ = tube length of test section
$\Delta P$ = pressure drop at test section
Q = volume flow rate at test section

References Cited

UNITED STATES PATENTS

| | | | |
|---|---|---|---|
| 2,700,891 | 2/1955 | Shafer | 73—55 |
| 2,934,944 | 5/1960 | Eolkin | 73—55 |
| 3,024,643 | 3/1962 | Jones | 73—55 |
| 3,116,630 | 1/1964 | Piros | 73—55 |
| 3,302,451 | 2/1967 | Martin | 73—55 |

LOUIS R. PRINCE, Primary Examiner

J. W. ROSKOS, Assistant Examiner

UNITED STATES PATENT OFFICE
CERTIFICATE OF CORRECTION

Patent No. 3,468,158      Dated September 23, 1969

Inventor(s) Sze—Foo Chien

It is certified that error appears in the above-identified patent and that said Letters Patent are hereby corrected as shown below:

In the specification, Column 2, lines 4 and 5, cancel "of the Bingham type fluids"; line 7, cancel "therefor" and insert --for Bingham type and power law fluids--; line 48, "radical" should be --radial--; line 71, the portion of equation (4) reading $$\frac{1}{3}\frac{\mathcal{T}_y}{\mathcal{T}_w}4 \quad \text{should read} \quad \frac{1}{3}\left(\frac{\mathcal{T}_y}{\mathcal{T}_w}\right)^4$$

Column 3, line 55, in the equation for $K_1$, the numerator readin $$\frac{D_1}{4}\frac{1}{L_1} \quad \text{should read} \quad \frac{D_1}{4}\left(\frac{1}{L_1}\right)$$

Column 3, lines 55 to 64 inclusive, in the equations for the values of $K_1$ and $K_2$, the parenthetical multiplier which reads, in each instance in the denominator $$\left(\frac{1}{D_2}3 - \frac{1}{D_1}3\right) \quad \text{should read} \quad \left(\frac{1}{D_2^3} - \frac{1}{D_1^3}\right)$$

Column 3, lines 65 to 69 inclusive, in the equation for the values of $K_3$ and $K_4$, the parenthetical multiplier which reads $$\left(\frac{1}{D_2^3 - D_1}3\right) \quad \text{should read} \quad \left(\frac{1}{D_2^3 - D_1^3}\right)$$

Column 8, line 26, that portion of the equation reading

"$\mathcal{T}y$"     should read     --$\mathcal{T}_y$--.

SIGNED AND SEALED

JUL 14 1970

(SEAL)
Attest:

Edward M. Fletcher, Jr.
Attesting Officer

WILLIAM E. SCHUYLER, JR.
Commissioner of Patents